(12) United States Patent
Hass et al.

(10) Patent No.: US 8,719,768 B2
(45) Date of Patent: May 6, 2014

(54) ACCRETION OF INTER-NAMESPACE INSTANCES IN MULTI-TENANT CIMOM ENVIRONMENT

(75) Inventors: Jon R. Hass, Austin, TX (US); Radhakrishna Reddy Dasari, Round Rock, TX (US); Javier L. Jimenez, Austin, TX (US); Khachatur Papanyan, Austin, TX (US); Jianwen Yin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1642 days.

(21) Appl. No.: 11/466,147

(22) Filed: Aug. 22, 2006

(65) Prior Publication Data

US 2008/0052673 A1 Feb. 28, 2008

(51) Int. Cl.
G06F 9/44 (2006.01)
G06F 17/30 (2006.01)

(52) U.S. Cl.
USPC .............................. 717/104; 717/120; 707/722

(58) Field of Classification Search
None
See application file for complete search history.

(56) References Cited

U.S. PATENT DOCUMENTS

| | | | | |
|---|---|---|---|---|
| 6,317,748 | B1 | 11/2001 | Menzies et al. | 707/103 X |
| 6,560,591 | B1 * | 5/2003 | Memmott et al. | 707/752 |
| 6,754,664 | B1 * | 6/2004 | Bush | 1/1 |
| 6,862,736 | B2 | 3/2005 | Hudis et al. | 719/316 |
| 6,895,586 | B1 * | 5/2005 | Brasher et al. | 719/313 |
| 6,971,090 | B1 | 11/2005 | Gruttadauria et al. | 717/136 |
| 6,976,262 | B1 * | 12/2005 | Davis et al. | 719/328 |
| 7,143,156 | B2 | 11/2006 | Menzies et al. | 709/223 |
| 7,165,104 | B2 * | 1/2007 | Wang | 709/224 |
| 7,627,593 | B2 * | 12/2009 | Boykin et al. | 1/1 |
| 7,627,865 | B2 * | 12/2009 | Muhlestein et al. | 717/165 |
| 7,937,711 | B2 * | 5/2011 | Hass et al. | 719/316 |
| 2002/0091809 | A1 | 7/2002 | Menzies et al. | 709/223 |
| 2002/0107872 | A1 | 8/2002 | Hudis et al. | 707/104.1 |
| 2002/0108102 | A1 * | 8/2002 | Muhlestein et al. | 717/124 |
| 2003/0055948 | A1 * | 3/2003 | Wang | 709/224 |
| 2004/0025142 | A1 * | 2/2004 | Mandal et al. | 717/104 |

(Continued)

OTHER PUBLICATIONS

Cooperstein, J., et al., "Windows Management Instrumentation: Administering Windows and Applications Across Your Enterprise", MSDN Magazine [online], 2000 [retrieved May 18, 2012], Retrieved from Internet: <http://homepage.mac.com/paullalonde/divers/msdn_mag/Administering%20Windows%20and%20Applications.pdf>, pp. 1-15.*

(Continued)

Primary Examiner — Don Wong
Assistant Examiner — Todd Aguilera
(74) Attorney, Agent, or Firm — Terrile, Cannatti, Chambers & Holland, LLP; Stephen A. Terrile

(57) ABSTRACT

A system and method for identifying duplicate or similar class instances existing in two or more Common Information Model (CIM) namespaces, accreting them, and thereafter returning a set of class instances and their associated information based on predetermined criteria. In different embodiments of the invention, an abstraction layer is implemented to provide a consolidation namespace operable to aggregate CIM instance data from two or more namespaces into a single namespace. A CIM client management application can then access and search the resulting consolidation namespace for all CIM class instances instead of iteratively browsing individual namespaces. A consolidation provider queries CIM namespaces to enumerate instances of CIM namespaces, which are consolidated in the Interop namespace, and similarly enumerates class instance data, which is consolidated in the consolidation namespace.

20 Claims, 6 Drawing Sheets

(56) References Cited

U.S. PATENT DOCUMENTS

| | | | |
|---|---|---|---|
| 2004/0215764 A1* | 10/2004 | Allen et al. | 709/224 |
| 2005/0027850 A1 | 2/2005 | Menzies et al. | 709/223 |
| 2005/0108725 A1 | 5/2005 | Hudis et al. | 719/316 |
| 2005/0193109 A1 | 9/2005 | Hudis et al. | 709/223 |
| 2006/0106863 A1 | 5/2006 | Ramasamy Venkatraj R | 707/103 |
| 2006/0136434 A1* | 6/2006 | Campbell et al. | 707/100 |
| 2006/0242284 A1 | 10/2006 | Savage | 709/223 |
| 2007/0240165 A1* | 10/2007 | Carey et al. | 719/310 |
| 2008/0005305 A1* | 1/2008 | Hass et al. | 709/223 |

OTHER PUBLICATIONS

Wright, C., et al. "Versatiliy and Unix Semantics in Namespace Unification," ACM Transactions on Storage [online], Feb. 2006 [retrieved on Nov. 13, 2013], Retrieved from Internet: <http://unionfs.filesystems.org/docs/unionfs-tos/unionfs.pdf>, pp. 1-29.*

* cited by examiner

ACCRETION OF INTER-NAMESPACE INSTANCES IN MULTI-TENANT CIMOM ENVIRONMENT

BACKGROUND OF THE INVENTION

1. Field of the Invention

The present invention relates in general to the field of information handling systems and more specifically, to systems management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems continue to grow in power, capabilities and variety, and with the advent of the Internet, they have also become more numerous and more distributed. As a result, their management has become increasingly complex, in part due to the growing heterogeneity of the elements that comprise them and the diversity of their associated management environments. In response, the Distributed Management Task Force (DMTF) has developed frameworks that facilitate the interoperable exchange of management information between managed elements and corresponding management systems. One of these frameworks is the Common Information Model (CIM), which provides a consistent definition and structure of management information through the use of object-oriented techniques. As a conceptual information model, the CIM is structured such that managed environments can be viewed as collections of interrelated systems, each of which is comprised of a number of discrete elements.

The CIM, comprised of a specification and a schema, allows management-related information about these elements to be transparently exchanged between management systems. The specification describes an object-oriented meta model based on the Unified Modeling Language (UML) and defines how the CIM can be integrated with other management models. These include, but are not limited to, Simple Network Management Protocol (SNMP) Management Information Base (MIB) or DMTF Management Information Format (MIF). The CIM schema currently defines thousands of classes with properties, methods and associations that represent component elements such as, but not limited to, processors, firmware, sensors and fans, as a common set of managed objects. The CIM schema also allows for the definition of namespaces, a directory-like structure that allows classes to be organized in a more hierarchical structure. Classes within these namespaces are served by data providers, which communicate with managed objects to access data and event notifications. These providers typically implement profiles that define the CIM model and associated behavior for a management domain comprising one or more namespaces within a CIM Object Manager (CIMOM). While this architecture facilitates the tracking and depiction of interdependencies and associations between managed objects, multi-provider implementations pose challenges for CIM management clients that consume interrelated data from multiple namespaces.

For example, a CIM client is currently required to traverse though all registered profiles to determine which profiles have been implemented in each namespace and then enumerate and keep track of their associations. In addition, the client also needs to determine which central CIM class instances are associated with each of the profiles in each namespace, and then integrate all associated namespace data into a consolidated data structure representing the managed system. This approach can result in inconsistencies in data populated across different CIM-based client management applications, leading to interoperability, data integrity and manageability issues. The situation is further complicated when an overlap of CIM data exists in different namespaces. As an example, suppose provider 'A' implements classes 1', '2' and '3' in namespace 'A'. Provider 'B' implements classes '3', '4' and '5' in namespace 'B'. Requests for instances of classes '1' and '2' are routed to namespace 'A' and are returned by provider 'A'. Likewise, requests for instances of classes '4' and '5' are routed to namespace 'B' and returned by provider 'B'. However, returned instances of requests for class '3' may contain duplicates as it exists in both namespace 'A' and 'B'. Current approaches to this issue include the implementation of centralized CIM object repositories. Other approaches provide uniformly rendered results regardless of the source of the information, but require the CIM client to have foreknowledge of the namespace in which the information resides. Furthermore, none of these address multi-provider CIMOM implementations that comprise multiple namespaces, nor do they address the issue of CIM clients consuming interrelated CIM data from such a CIMOM. In view of the foregoing, there is a need for identifying duplicate class instances when they exist in two or more namespaces and based on predetermined criteria, selecting only the unique set of class instances to be returned.

SUMMARY OF THE INVENTION

In accordance with the present invention, a system and method is disclosed for identifying duplicate or similar class instances existing in two or more Common Information Model (CIM) namespaces, accreting them, and thereafter returning a set of class instances and their associated information based on predetermined criteria. In different embodiments, an abstraction layer is implemented to provide a consolidation namespace operable to aggregate CIM instance data from two or more namespaces into a single namespace. In an embodiment of the invention, an interop namespace is implemented to define and extend CIM classes by adding a "ConsolidationSourceNamespace," which comprises namespace instances consolidated by the consolidation namespace. As a result, a CIM client management application can access and search the consolidation namespace for all CIM class instances instead of iteratively browsing individual namespaces, thereby minimizing processing for the client.

In an embodiment of the invention, a consolidation provider comprises a consolidation instance provider and a consolidation provider client. The consolidation provider client queries CIM namespaces to collect CIM class instance information, which it provides to the consolidation instance provider. In turn, the consolidation instance provider enumerates instances of CIM namespaces, which are consolidated in the interop namespace, and similarly enumerates class instance data, which is consolidated in the consolidation namespace. In an embodiment of the invention, the consolidation provider is implemented such that it is operable to execute actions received from a CIM Object Manager (CIMOM) and provide results back to the CIMOM. In this and other embodiments of the invention, information is exchanged between the consolidation namespace and other namespaces administered by the CIMOM by, but not limited to, loading libraries, command line interface (CLI), and data files for static information.

In an embodiment of the invention, a CIM Class Data Source Configuration (CCDSC) file comprises an algorithm implemented to determine Get operations for CIM management client enumeration requests. In one embodiment of the invention, all CIM class instances from all CIM namespaces are enumerated and returned. In another embodiment of the invention, CIM class instances are enumerated and returned based on predetermined prioritization of CIM namespaces. For example, a class instance of a network port fan from a first hardware vendor in a first namespace may take priority over a class instance of a network port fan from a second hardware vendor in a second namespace. In this embodiment of the invention, if enumeration fails for a namespace, the namespace with the next level of priority is accessed for enumeration. In another embodiment of the invention, CIM class instances are enumerated and returned after duplicate instances are removed based on key value comparison and priority of namespaces. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for identifying duplicate or similar class instances existing in two or more Common Information Model (CIM) namespaces, accreting them, and thereafter returning a set of class instances and their associated information based on predetermined criteria. In different embodiments of the invention, an abstraction layer is implemented to provide a consolidation namespace operable to aggregate CIM instance data from two or more namespaces into a single namespace. As a result, a CIM client management application can access and search the consolidation namespace for all CIM class instances instead of iteratively browsing individual namespaces, thereby minimizing processing for the client.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
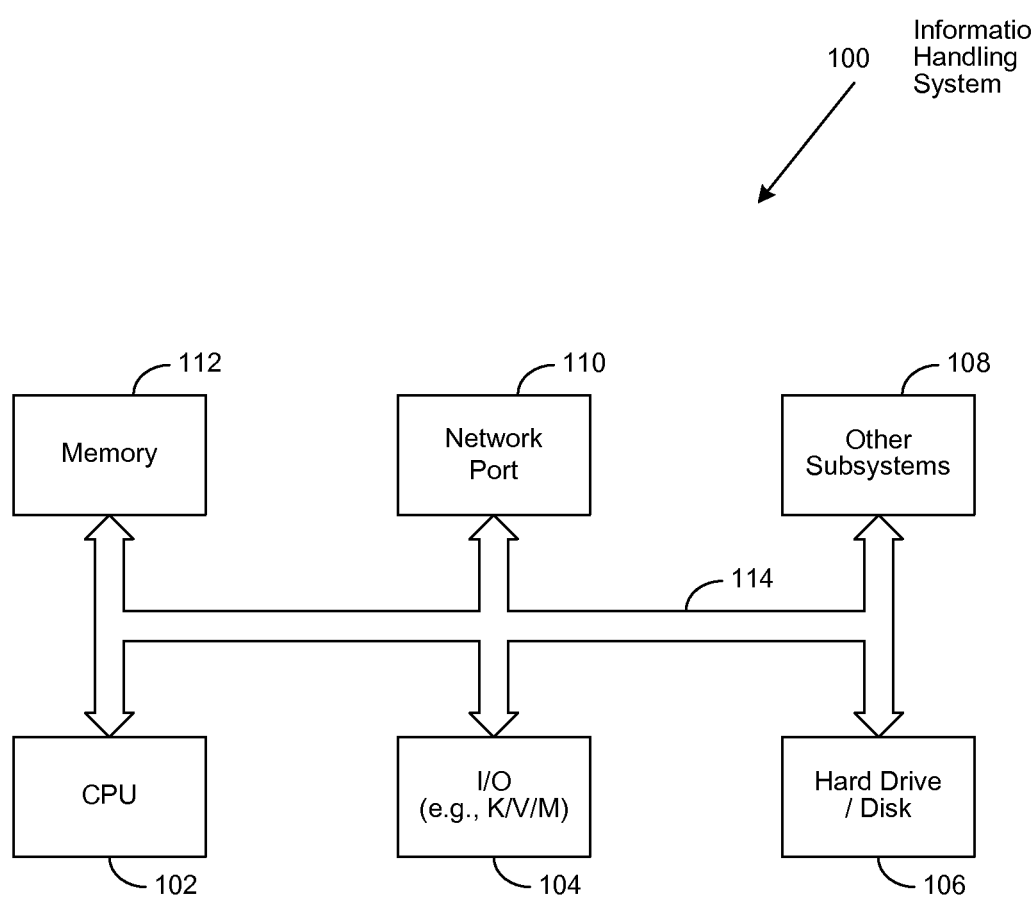
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110, and system memory 112, all interconnected via one or more buses 114.

Figure 2:
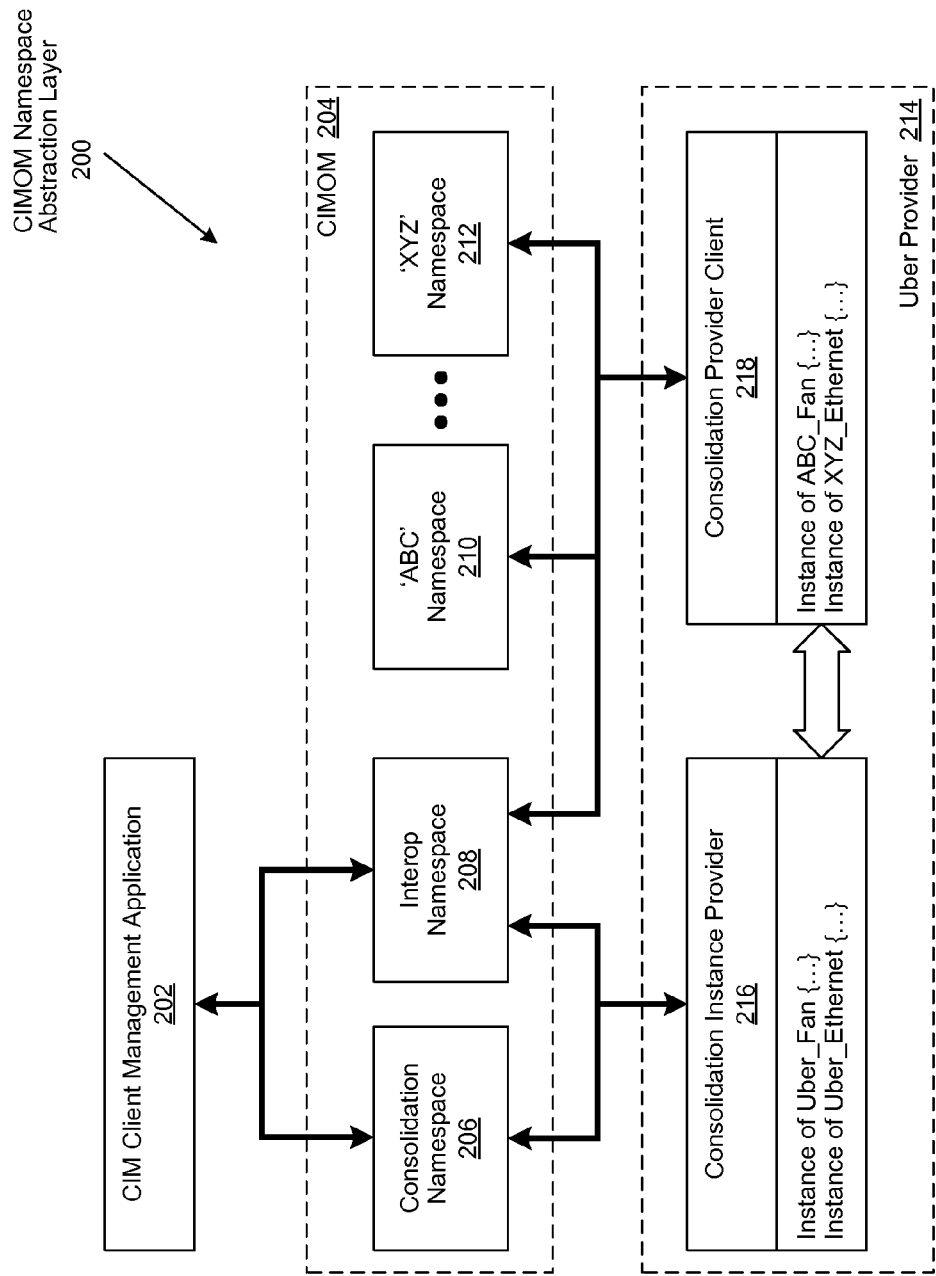
FIG. 2 is a generalized block diagram of a Common Information Model (CIM) Object Manager (CIMOM) abstraction layer implemented as a consolidation namespace in accordance with an embodiment of the invention.

FIG. 2 is a generalized block diagram of a Common Information Model (CIM) Object Manager (CIMOM) abstraction layer 200 implemented as a consolidation namespace in accordance with an embodiment of the invention. In this embodiment of the invention, CIMOM 204 comprises consolidation namespace 206, interop namespace 208, and CIM namespaces 'ABC' 210 through 'XYZ' 212. interop namespace 208 defines and extends CIM classes by adding a ConsolidationSourceNamespace property, which comprises CIM namespaces 'ABC' 210 through 'XYZ' 212, whose CIM instance data is aggregated by consolidation namespace 206.

Uber provider 214 enumerates all instances of CIM_Namespace in interop namespace 208 and comprises consolidation instance provider 216 and consolidation provider client 218. Consolidation instance provider 216 then receives action requests for CIM instance data from consolidation namespace 206 which are then routed to consolidation provider client 218 to gather CIM instance data from CIM namespaces 'ABC' 210 through 'XYZ' 212. The CIM instance data gathered by consolidation provider client 218 is then consolidated by consolidation instance provider 216 and communicated to CIMOM 404, where it is written in consolidation namespace 206. In this and other embodiments of the invention, information is exchanged between consolidation namespace 206 and other namespaces 208, 210, 212 administered by CIMOM 204 by, but not limited to, loading libraries, command line interface (CLI), and data files for static information. As a result, CIM client management application 202 can access consolidation namespace 206 and Interop namespace 208, comprising CIMOM 204, for all CIM class instances instead of individually browsing namespaces 'ABC' 210 through 'XYZ' 212.

Figure 3:
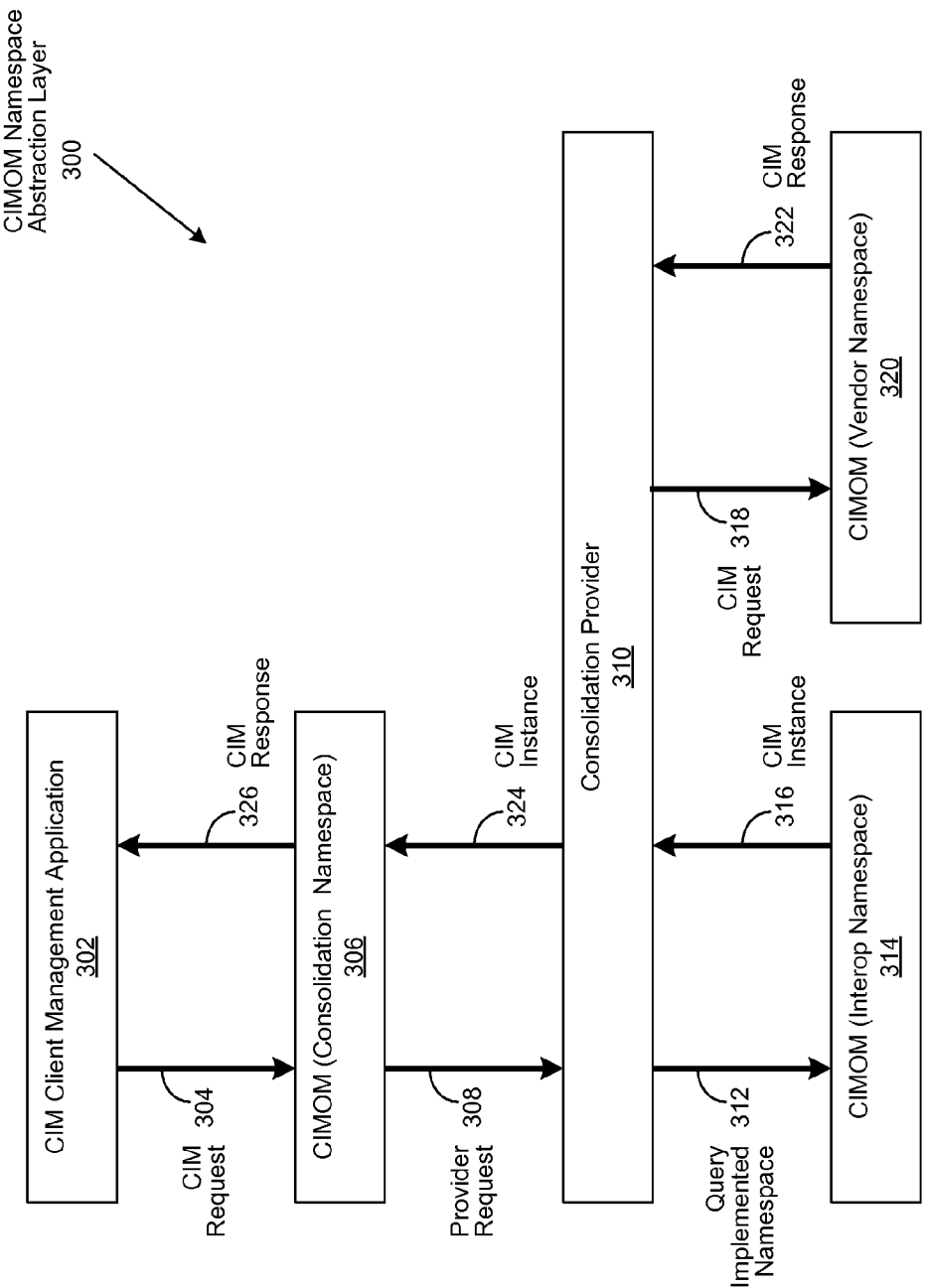
FIG. 3 is a generalized process flow diagram depicting a CIMOM abstraction layer implemented as a consolidation namespace in accordance with an embodiment of the invention.

FIG. 3 is a generalized process flow diagram depicting a CIMOM abstraction layer 300 implemented as a consolidation namespace in accordance with an embodiment of the invention. In this process flow, CIM client management application 302 submits CIM information request 304 to CIMOM 306, which comprises a consolidation namespace as described in greater detail hereinabove. CIMOM 306 composes and conveys a provider request 308 to consolidation provider 310 for the requested information. In turn, consolidation provider 310 submits an implemented namespace query 312 to interop namespace 314, which then submits the requested CIM information instance 316 through consolidation provider 310 as a CIM information request 318 to one or more vendor namespaces 320. The CIM information response 322 is then routed through consolidation provider 310 as a CIM information instance 324 to consolidation namespace 306, which in turn provides a CIM information response 326 to CIM client management application 302.

Figure 4:
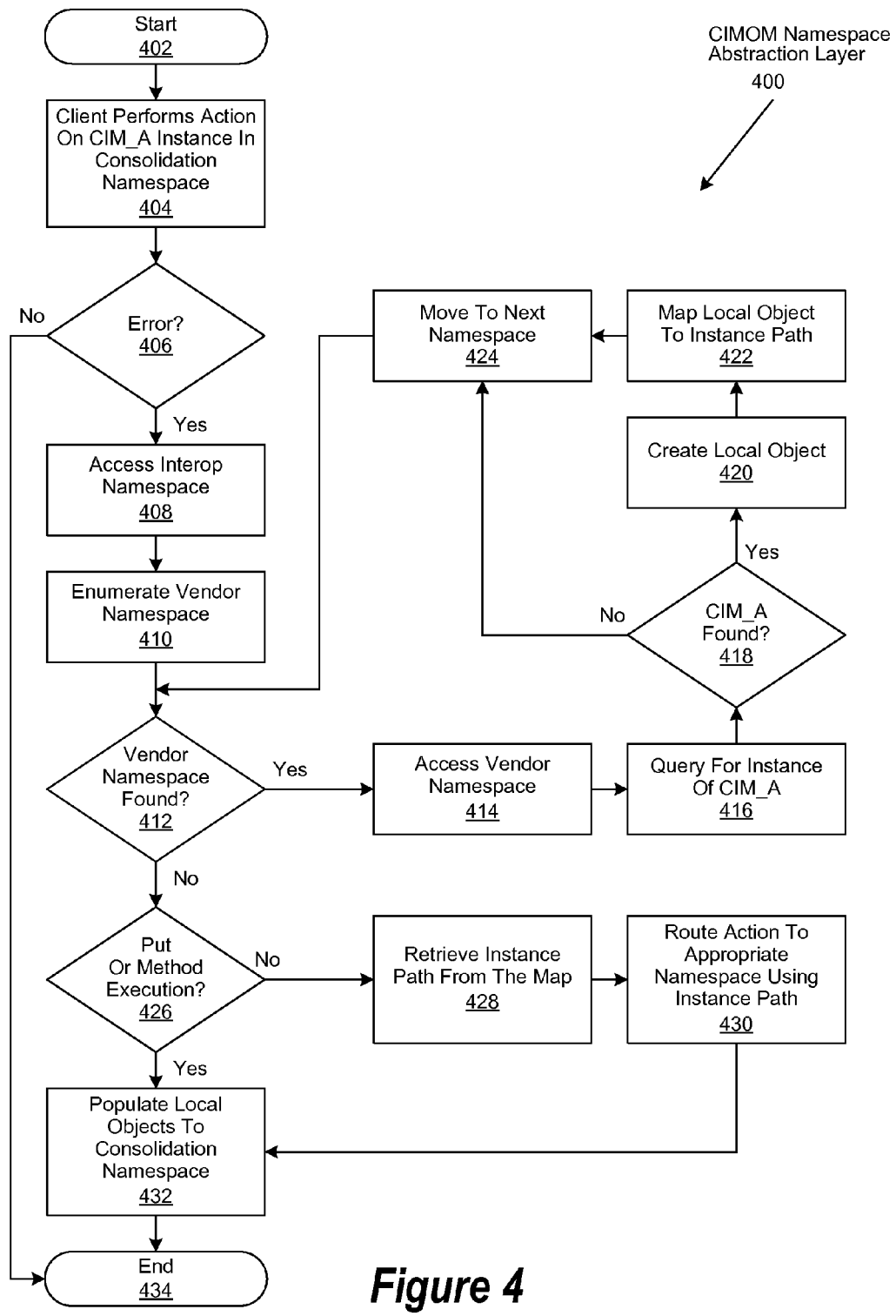
FIG. 4 is a generalized flow chart illustrating a CIMOM abstraction layer implemented as a consolidation namespace in accordance with an embodiment of the invention.

FIG. 4 is a generalized flow chart illustrating a CIMOM abstraction layer 400 implemented as a consolidation namespace in accordance with an embodiment of the invention. In step 402, implementation of the CIMOM abstraction layer begins as a CIM client accesses a consolidation namespace for an instance of class CIM_A to perform an action ACT_A in step 404. If class CIM_A is defined in the consolidation namespace and the intended action is supported, then the result is returned in step 406 to the CIM client and implementation of the CIMOM abstraction layer ends in step 434. If, however, class CIM_A is not defined or the intended action is not supported, then the Interop namespace is accessed in step 408 and the consolidation provider is called to enumerate all the instances of CIM_NameSpace in the Interop namespace in step 410. If the requested CIM_NameSpace is found in step 412, then it is accessed in step 414 and queried for instances of CIM_A in step 416. If an instance of CIM_A is not found in step 418, then the next enumerated namespace is accessed in step 424 and the process is repeated, beginning with step 412. Otherwise, once an instance of CIM_A is found in step 418, a local object is created in step 420 and an instance path is then created in step 422, mapping the instance to its associated namespace. Afterwards, the next enumerated namespace is accessed in step 424 and the process is repeated, beginning with step 412.

Once all enumerated namespaces have been found and accessed in step 412, it is determined in step 426 whether ACT_A is an enumeration or get, in which case, local objects representing instances of CIM_A are populated in the consolidation namespace in step 432 and implementation of the CIMOM abstraction layer ends in step 434. If it is determined in step 426 that ACT_A is a put or method execution, the consolidation provider will retrieve the associated instance path created in step 433 to determine the instance's associated namespace and provider information in step 428. Once the instance's associated namespace and provider information has been determined, the consolidation provider uses the instance path to route the request to the associated namespace and ACT_A is performed in step 430. Once ACT_A has been performed, local objects representing instances of CIM_A are populated in the consolidation namespace in step 432 and implementation of the CIMOM abstraction layer ends in step 434.

Figure 5A:
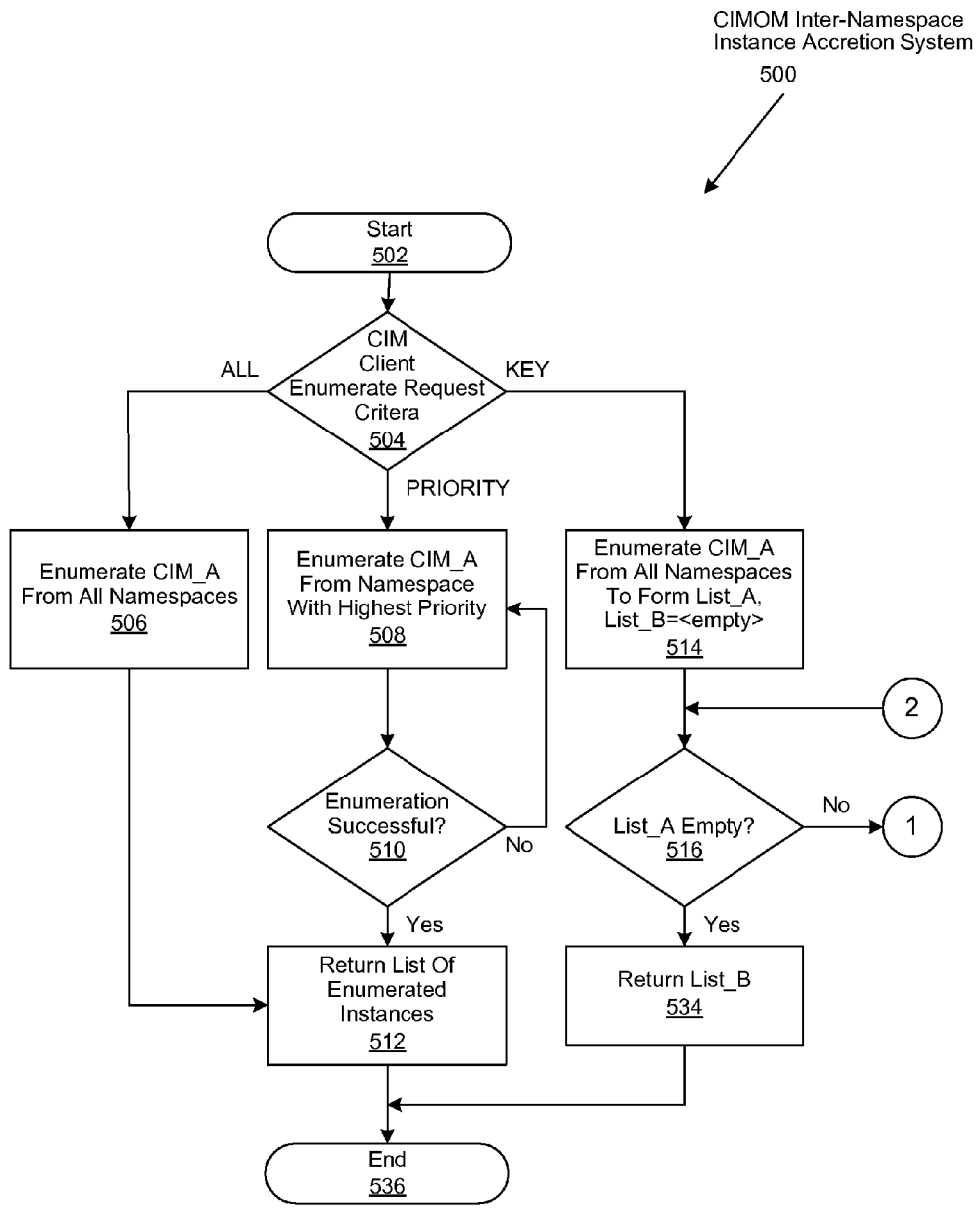
FIGS. 5a and 5b, generally referred to as FIG. 5, are a generalized flowchart illustrating a consolidation namespace implemented as a CIMOM inter-namespace instance accretion system in accordance with an embodiment of the invention.
Figure 5B:
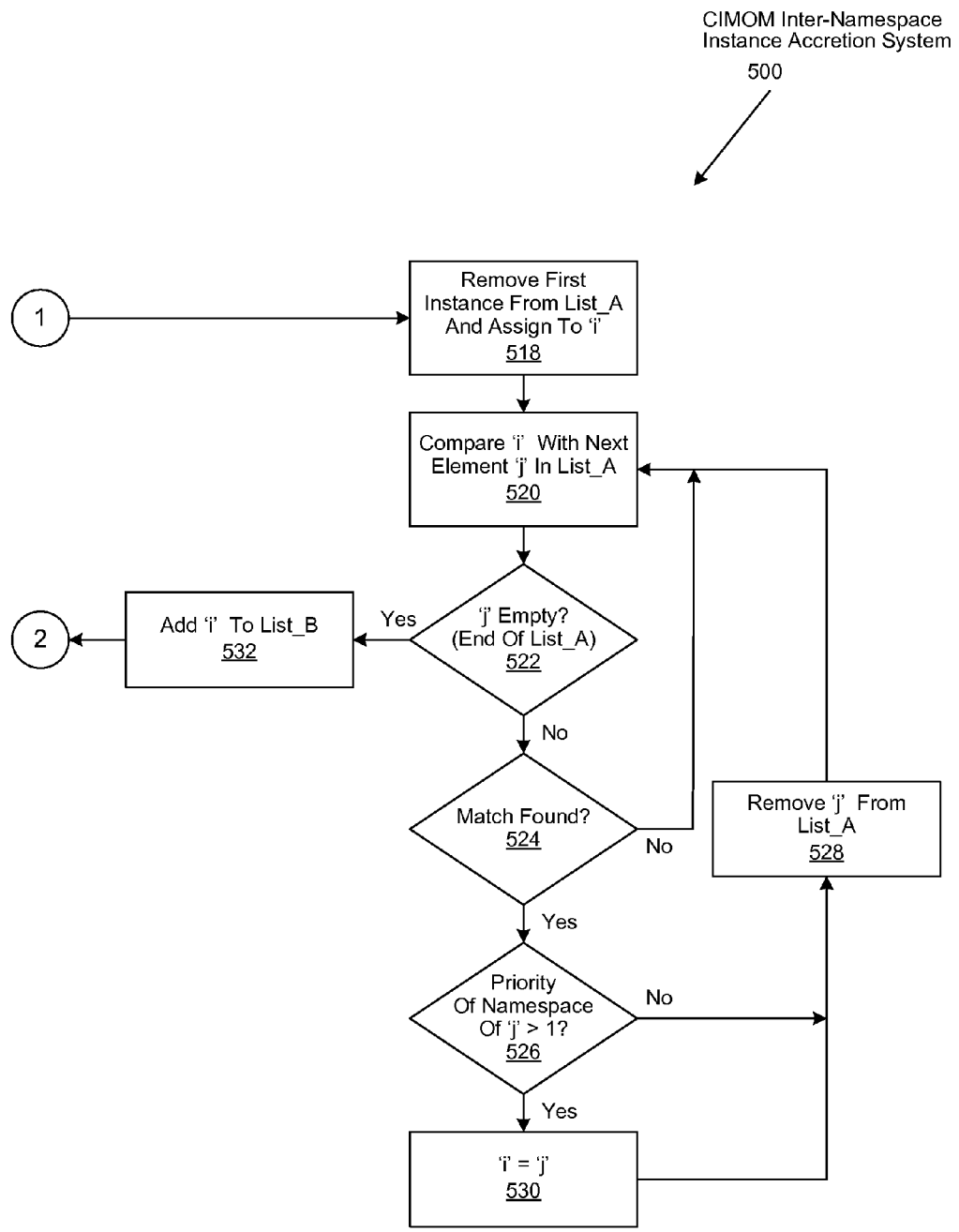

FIG. 5 is a generalized flowchart illustrating a consolidation namespace implemented as a CIMOM inter-namespace instance accretion system 500 in accordance with an embodiment of the invention. In step 502, operation of the CIMOM inter-namespace instance accretion system 500 begins by a CIM client submitting a request to the consolidation namespace to enumerate all instances of class CIM_A. In one embodiment of the invention, a CIM Class Data Source Configuration (CCDSC) file comprises an algorithm implemented to determine Get operations for enumeration requests in step 504 as set forth at the end of the specification.

If it is determined in step 504 that the criteria tag of the CIM client request='All', then all instances of CIM_A from all namespaces with 'Trusted' tag=TRUE is enumerated in step 506. Once all instance of CIM_A have been enumerated, a consolidated list of instances is returned in step 512 and processing of the consolidation namespace is ended in step 536. If it is determined in step 504 that the criteria tag of the CIM client request='Priority,' then instances of CIM_A are enumerated beginning with the predetermined priority data source in step 508. If enumeration is not successful in step 510, then the namespace with the next level of priority is accessed and the process is repeated, beginning with step 508, until all trusted namespaces have been accessed or enumeration is successful. Once all instance of CIM_A have been enumerated, a consolidated list of instances is returned in step 512 and processing of the consolidation namespace is ended in step 536.

If it is determined in step 504 that the criteria tag of the CIM client request='Key, then instances of CIM_A are enumerated from all the namespaces with 'Trusted' tag=TRUE to form a List_A in step 514. At the same time, an empty List_B is formed with no contents. If it is determined in step 516 that List_A is empty, then List_B is returned in step 534 and processing of the consolidation namespace is ended in step 536. If it is determined in step 516 that List_A is not empty, the first instance from List_A is removed and is assigned to a variable 'i' in step 518, which is then compared in step 520 against the next instance (e.g., 'j') in List_A. If it is determined in step 522 that the end of List_A has been reached, then 'i' is added to List_B in step 532. List_B is then returned in step 534 and processing of the consolidation namespace is ended in step 536.

If it is determined in step 522 that the end of List_A has not been reached, then it is determined in step 524 whether the key value of 'i' matches the next instance 'j' in List_A. If a match is not found in step 524, the process repeats, beginning with step 520. If the key value of 'i' matches the next instance 'j' in List_A, then it is determined in step 526 whether the priority of the namespace comprising 'j' is greater than that of the namespace comprising 'i'. If it is, then the value of 'j' is substituted for 'i' in step 530 and T is removed from List_A in step 528. The new value of 'i' is then compared in step 520 against the next instance (e.g., 'j') in List_A. If it is determined in step 522 that the end of List_A has been reached, then 'i' is added to List_B in step 532. List_B is then returned in step 534 and processing of the consolidation namespace is ended in step 536.

If it is determined in step 526 that the priority of the namespace comprising 'j' is not greater than that of the namespace comprising 'i', then 'j' is removed from List_A in step 528 and the value of 'i' is then compared in step 520 against the next instance in List_A. If it is determined in step 522 that the end of List_A has been reached, then 'i' is added to List_B in step 532. List_B is then returned in step 534 and processing of the consolidation namespace is ended in step 536. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

```
<consolidation>
   <class name = CIM_A>
      <criteria>
         ALL
      </criteria>
      <datasources>
         <datasource name=source 1>
            <namespace>
               <Name> ns1 </Name>
               <trusted> True </trusted>
            <namespace>
               <priority> 1 </priority>
         </datasource>
         <datasource name=source 2>
            <Name> ns2 </Name>
            <trusted> True </trusted>
            <namespace>
               <priority> 2 </priority>
         </datasource>
      </datasource>
   </class>
   <class name = CIM_B>
      <criteria>
         PRIORITY
      </criteria>
      <datasources>
         <datasource name=source 1>
            <namespace>
               <Name> ns1 </Name>
               <trusted> True </trusted>
            <namespace>
               <priority> 1 </priority>
         </datasource>
         <datasource name=source 3>
            <Name> ns3 </Name>
            <trusted> True </trusted>
            <namespace>
               <priority> 2 </priority>
         </datasource>
      </datasource>
   </class>
   <class name = CIM_C>
      <criteria>
         KEY
      </criteria>
      <datasources>
         <datasource name=source 4>
            <namespace>
               <Name> ns4 </Name>
               <trusted> True </trusted>
            <namespace>
               <priority> 1 </priority>
         </datasource>
         <datasource name=source 5>
            <Name> ns5 </Name>
            <trusted> True </trusted>
            <namespace>
               <priority> 2 </priority>
         </datasource>
      </datasource>
   </class>
</consolidation>
```

What is claimed is:

1. An information handling system, comprising:
a processor configured to perform data processing operations;
a plurality of managed elements, wherein said plurality of managed elements are defined by a plurality of common information model (CIM) classes and individual CIM classes of said plurality of CIM classes are duplicated in two or more CIM namespaces;
a managed object format (MOF), configured to define a consolidation source namespace property to extend said plurality of CIM classes comprising said two or more CIM namespaces;
a CIM object manager (CIMOM) configured to use said MOF to generate a consolidation namespace, wherein said consolidation namespace comprises a single listing of said extended CIM classes;
a data provider configured to access said two or more CIM namespaces to provide predetermined CIM instance data to said CIMOM for populating said extended CIM classes; and
a client configured to access said consolidation namespace and manage said predetermined CIM instance data comprising said extended CIM classes; and,
a CIMOM inter-namespace instance accretion component, the CIMOM inter-namespace instance accretion component determining a get operation for enumeration requests, the determining the get operation comprising determining a value of a criteria tag of a CIM client request, and when the criteria tag corresponds to all then the CIMOM inter-namespace instance accretion component enumerating all instances of an individual CIM class, when the criteria tag corresponds to priority then the CIMOM inter-namespace instance accretion component enumerating instances beginning with a predetermined priority data source until a successful enumeration, and when the criteria tag corresponds to key then the CIMOM inter-namespace instance accretion component comparing priorities of matching instances, and removing a lower priority matching instance from a list.

2. The system of claim 1, wherein said CIMOM is further operable to consolidate class instances of individual managed elements comprising said two or more CIM namespaces into said consolidation namespace.

3. The system of claim 2, wherein said CIMOM is further operable to process enumeration requests from said client.

4. The system of claim 3, wherein said CIMOM is further operable to enumerate all class instances comprising said consolidation namespace.

5. The system of claim 3, wherein said CIMOM is further operable to enumerate duplicate class instances in said consolidation namespace.

6. The system of claim 5, wherein said CIMOM is further operable to accrete said duplicate class instances in said consolidation namespace.

7. The system of claim 5, wherein said CIMOM is further operable to prioritize said duplicate predetermined class instances prior to accretion of said duplicate class instances in said consolidation namespace.

8. The system of claim 1, wherein said CIMOM is further operable to populate said consolidation source namespace property of said extended CIM classes with the source namespace of said plurality of CIM classes.

9. The system of claim 1, wherein said data provider is further operable to execute instructions issued by said CIMOM.

10. The system of claim 1, wherein said data provider is further operable to interface with said predetermined CIM instance data through loading of libraries and data files.

11. A method of managing a plurality of managed elements in an information handling system, said plurality of managed elements defined by common information model (CIM) classes existing in two or more CIM namespaces, the method comprising:

using a processor configured to perform data processing operations;

using a plurality of managed elements, wherein said plurality of managed elements are defined by a plurality of CIM classes and individual CIM classes of said plurality of CIM classes are duplicated in two or more common information model (CIM) namespaces;

using a managed object format (MOF), configured to define a consolidation source namespace property to extend said plurality of CIM classes comprising two or more said CIM namespaces;

using a CIM object manager (CIMOM) configured to use said MOF to generate a consolidation namespace, wherein said consolidation namespace comprises a single listing of said extended CIM classes, said single listing further comprising no duplicates of said extended CIM classes;

using a data provider configured to access said two or more CIM namespaces to provide predetermined CIM instance data to said CIMOM for populating said extended CIM classes; and using a client configured to access said consolidation namespace and manage said predetermined CIM instance data comprising said extended CIM classes; and, performing a CIMOM inter-namespace instance accretion operation, the CIMOM inter-namespace instance accretion operation determining a get operation for enumeration requests, the determining the get operation comprising determining a value of a criteria tag of a CIM client request, and when the criteria tag corresponds to all then the CIMOM inter-namespace instance accretion operation enumerating all instances of an individual CIM class, when the criteria tag corresponds to priority then the CIMOM inter-namespace instance accretion operation enumerating instances beginning with a predetermined priority data source until a successful enumeration, and when the criteria tag corresponds to key then the CIMOM inter-namespace instance accretion operation comparing priorities of matching instances, and removing a lower priority matching instance from a list.

12. The method of claim 11, further comprising:
using said CIMOM to consolidate class instances of individual managed elements comprising said two or more CIM namespaces into said consolidation namespace.

13. The method of claim 12, further comprising:
using said CIMOM to process enumeration requests from said client.

14. The method of claim 13, further comprising:
using said CIMOM to enumerate all class instances comprising said consolidation namespace.

15. The method of claim 13, further comprising:
using said CIMOM to enumerate duplicate class instances in said consolidation namespace.

16. The method of claim 15, further comprising:
using said CIMOM to accrete said duplicate class instances in said consolidation namespace.

17. The method of claim 15, further comprising:
using said CIMOM to prioritize said duplicate class instances prior to accretion of said duplicate class instances in said consolidation namespace.

18. The method of claim 11, further comprising:
using said CIMOM to populate said consolidation source namespace property of said extended CIM classes with the source namespace of said plurality of CIM classes.

19. The method of claim 11, further comprising:
using said data provider to execute instructions issued by said CIMOM.

20. The method of claim 11, further comprising:
using said data provider to interface with said predetermined CIM instance data through loading of libraries and data files.

* * * * *